(12) United States Patent
Tsutsumi

(10) Patent No.: US 7,336,393 B2
(45) Date of Patent: Feb. 26, 2008

(54) COLOR IMAGE READING APPARATUS AND DOCUMENT SIZE DETECTING METHOD IN COLOR IMAGE READING APPARATUS

(75) Inventor: Kazuyoshi Tsutsumi, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1042 days.

(21) Appl. No.: 10/400,393

(22) Filed: Mar. 28, 2003

(65) Prior Publication Data

US 2004/0190089 A1 Sep. 30, 2004

(51) Int. Cl.
  *H04N 1/10* (2006.01)
  *H04N 1/48* (2006.01)
  *H04N 1/04* (2006.01)
  *G03G 15/00* (2006.01)

(52) U.S. Cl. .................. 358/1.9; 358/505; 358/449; 358/497; 399/45

(58) Field of Classification Search ............. 358/1.9, 358/296, 449, 488, 497, 505; 399/16, 380, 399/45; 355/75
See application file for complete search history.

(56) References Cited

U.S. PATENT DOCUMENTS 5,198,859 A * 3/1993 Soma et al. .................. 399/16
5,414,522 A * 5/1995 Moriya ....................... 358/296

FOREIGN PATENT DOCUMENTS

JP 6-59351 A 3/1994

* cited by examiner

*Primary Examiner*—Kimberly Williams
*Assistant Examiner*—Charlotte M. Baker
(74) *Attorney, Agent, or Firm*—Foley & Lardner LLP

(57) ABSTRACT

A color image reading apparatus includes a light source, first and second photoelectric conversion devices, first and second document size detection units and a control unit. The first photoelectric conversion device obtains first electric signal information at a first speed and the second photoelectric conversion device obtains second electric signal information at a second speed higher than the first speed. The first document size detection unit detects a document size based on the first electric signal information and the second document size detection unit detects a document size based on the second electric signal information. The control unit controls, at the time of forward scanning by the light source, so as to detect the document size by the second document detection unit.

15 Claims, 5 Drawing Sheets

COLOR IMAGE READING APPARATUS AND DOCUMENT SIZE DETECTING METHOD IN COLOR IMAGE READING APPARATUS

BACKGROUND OF THE INVENTION

1. Field of the Invention

The present invention relates to a color image reading apparatus used for document reading of a digital copying machine and an input terminal of a personal computer and a document size detecting method in the color image reading apparatus.

2. Description of the Related Art

In a color image reading apparatus which is used for a digital copying machine or a personal computer and reads optical image information from a document using a color charge coupled device (hereinafter abbreviated to CCD), a document size detecting device for forward-scanning a document at the time of pre-scanning, deciding whether the document is a color document or a monochromatic document, at the time of backward scanning, detecting the document size on the decision level based on the obtained decision result, thereby preventing a misdetection is disclosed in Japanese Patent Publication 6-59351. However, this conventional document size detecting device detects first the document size at the time of backward scanning, so that the pre-scanning time for detecting the document size is prolonged and it is an obstacle to speeding up the image reading operation.

Furthermore, in a color image reading apparatus using a color CCD sensor, conventionally, regardless of a color document or a monochromatic document, an apparatus for detecting the document size by the color CCD sensor at the time of pre-scanning for detecting the document size is known. However, in this conventional apparatus, even for a monochromatic document the size of which can be originally detected in a short-time, the same detection time as that at the time of detection of the color document size is required to detect the document size. Therefore, in a monochromatic document, the pre-scanning time is wasted and speeding up of the reading operation is disturbed.

Therefore, in a color image reading apparatus using a color CCD sensor, it is desired to surely detect the document size regardless of a color document or a monochromatic document and shorten the pre-scanning time to speed up the image reading operation.

SUMMARY OF THE INVENTION

An object of the present invention is to shorten the document size detection time and speed up the image reading operation without impairing the accuracy of document size detection.

According to this embodiment of the present invention, the color image reading apparatus comprises a light source for irradiating a document relatively moving and scanning the document, a first photoelectric conversion device for receiving optical image information from the document and the background of the document by the light source and obtaining first electric signal information at a first speed, a second photoelectric conversion device for receiving the optical image information and obtaining second electric signal information at a second speed higher than the first speed, a first document size detection unit for detecting, on the basis of the first electric signal information from the first photoelectric conversion device, the boundary between the document and the background of the document and detecting the document size, a second document size detection unit for detecting, on the basis of the second electric signal information from the second photoelectric conversion device, the boundary between the document and the background of the document and detecting the document size, and a control unit for controlling, at the time of forward scanning of the document by the light source, so as to detect the document size using the second document size detection unit.

Further, according to the embodiment of the present invention, the document size detecting method in the color image reading apparatus having a first photoelectric conversion device for receiving optical image information from a document by a light source moving relatively to the document and obtaining electric signal information at a first speed and a second photoelectric conversion device for receiving the optical image information and obtaining the electric signal information at a second speed higher than the first speed, and detecting, on the basis of the first electric signal information from the first photoelectric conversion device, the boundary between the document and the background of the document, thereby detecting the document size or detecting, on the basis of the second electric signal information from the second photoelectric conversion device, the boundary between the document and the background of the document, thereby detecting the document size, at the time of forward scanning of the document by the light source, detects the document size on the basis of the second electric signal information from the second photoelectric conversion device.

DETAILED DESCRIPTION OF THE EMBODIMENTS

Figure 1:
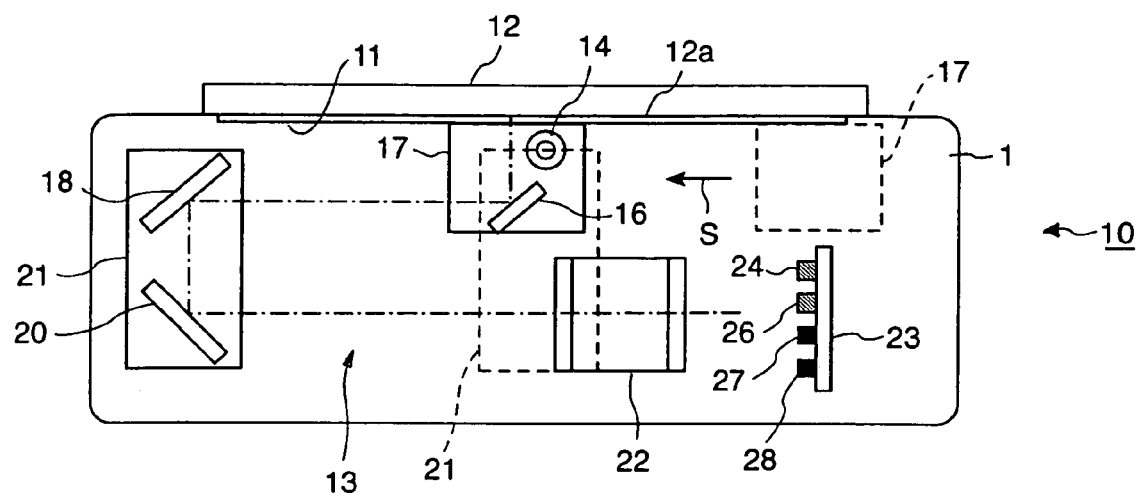
FIG. 1 is a schematic block diagram showing a color scanner of the embodiment of the present invention.
Figure 2:
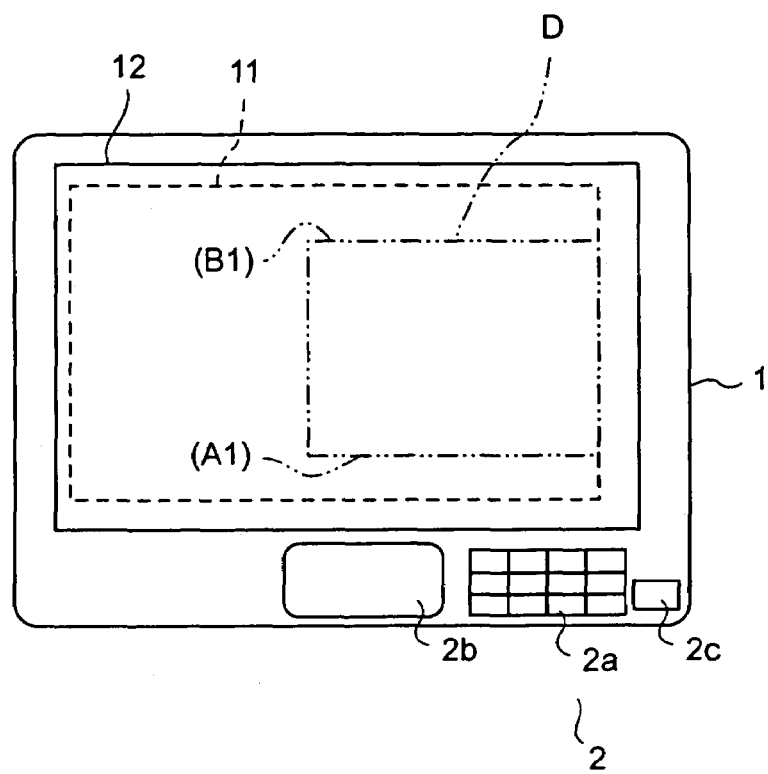
FIG. 2 is a schematic plan view of a color scanner of the embodiment of the present invention viewed from the top.

The embodiments of the present invention will be explained in detail hereunder with reference to the accompanying drawings. FIG. 1 shows a color image reading apparatus of the embodiment of the present invention and it is a schematic block diagram showing a color scanner 10 used in combination with a digital color printer 50. On the top of a body 1 of the color scanner 10, as shown in FIG. 2, a document plate 11 made of a transparent glass plate and a platen sheet 12 covering overall the document plate 11 are installed. A coating face 12a of the platen sheet 12 as a background of a document D loaded on the document plate 11 is composed of a colored plastic sheet material. Furthermore, on the top of the body 1, a control panel 2 having a ten-key pad 2a, a display panel 2b, and a start button 2c is installed.

Under the document plate 11, an optical unit 13 for irradiating light to the document D on the document plate 11 and detecting reflected light from the document D which is optical image information is installed. The optical unit 13 has a first carriage 17 for loading a xenon lamp 14 which is a light source and a first mirror 16, a second carriage 21 for loading a second and a third mirror 18 and 20, a focusing lens 22, and a 4-line CCD sensor 23 which is a photoelectric conversion device. The first carriage 17 and the second carriage 21 move back and forth by driving by a pulse motor 31 in the sub-scanning direction of the document plate 11. A control unit 30 for controlling the body of the color scanner 10 controls the pulse motor 31.

Figure 3:
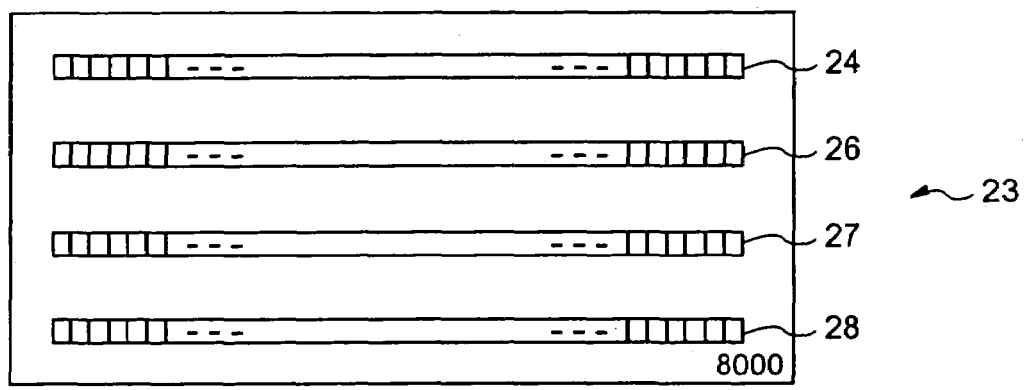
FIG. 3 is a schematic block diagram showing a 4-line CCD sensor of the embodiment of the present invention.

The 4-line CCD sensor 23, as shown in FIG. 3, is composed of 4 lines such as 3 lines of R (red), G (green), and B (blue) of color CCD sensors 24, 26, and 27 and 1 line of a monochromatic CCD sensor 28.

The respective CCD sensors 24 to 28 are structured so that for example, the size of one pixel is 8×8 μm, and the number of pixels of one line is 8000, and the line interval is 32 μm. The image reading speed of the color CCD sensors 24 to 27 is the first speed of 105 mm/s. On the other hand, the monochromatic CCD sensor 28 outputs by dividing into two parts of odd pixels and even pixels, so that the image reading speed thereof is the second speed of 210 mm/s which is two times of that of the color CCD sensors 24 to 27.

The 4-line CCD sensor 23 receives the reflected light from the document D, which is separated into R, G, and B, by the 3 lines of the color CCD sensors 24, 26, and 27, receives the reflected light, which is not separated, by the monochromatic CCD sensor 28, and photo-electrically converts them respectively to output signals which are electric signal information. The output signals from the CCD sensors 24 to 28 are subject to the signal processes such as adjustment of the amplification factor for each sensitivity of the CCD sensors 24 to 28, A-C conversion, and shading correction by a CCD control substrate 32 and transferred to the digital color printer 50 for image forming.

Figure 4:
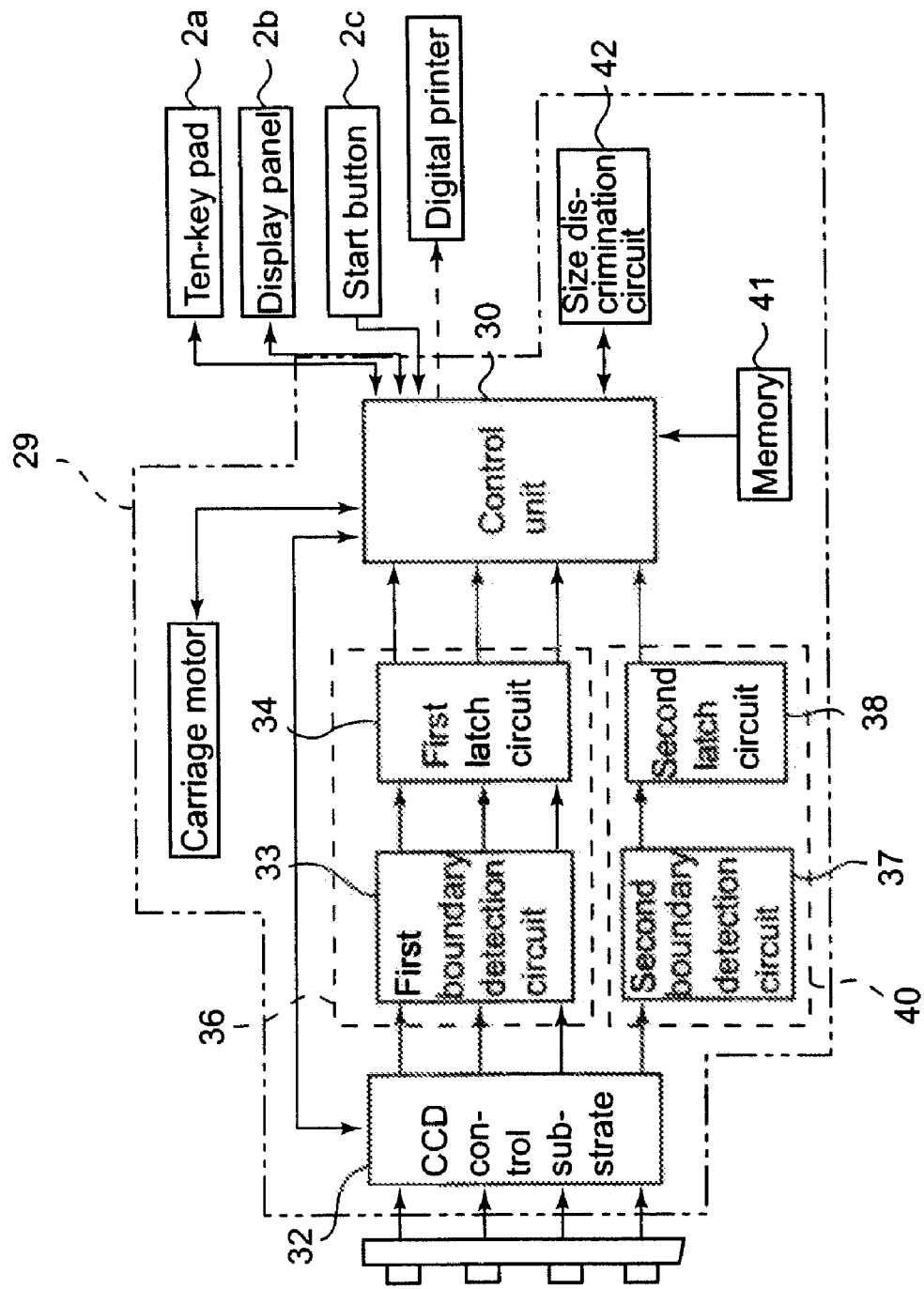
FIG. 4 is a block diagram showing a document size detection control system of the embodiment of the present invention.

FIG. 4 is a block diagram showing a document size detection control system 29 for executing size detection of the document D on the document plate 11 by the control unit 30 for controlling the whole color scanner 10. The control unit 30 is connected to the ten-key pad 2a, the display panel 2b, and the start button 2c on the control panel 2, and a pulse motor 31 or the CCD control substrate 32 and controls the entire color scanner 10.

The document size detection control system 29 has a first document size detection unit 36. The first document size detection unit 36 has a first boundary detection circuit 33 for detecting the boundary between the coating face 12a of the platen sheet 12 and the document D from color output signals from the color CCD sensors 24 to 27 which are processed by the CCD control substrate 32 and a first latch circuit 34 for latching the address of the color CCD sensors 24 to 27 corresponding to the boundary obtained by the first boundary detection circuit 33 and inputting them to the control unit 30.

Further, the document size detection control system 29 has a second document size detection unit 40. The second document size detection unit 40 has a second boundary detection circuit 37 for detecting the boundary between the coating face 12a of the platen sheet 12 and the document D from a monochromatic output signal from the monochromatic CCD sensor 28 which is processed by the CCD control substrate 32 and a second latch circuit 38 for latching the address of the monochromatic CCD sensor 28 corresponding to the boundary obtained by the second boundary detection circuit 37 and inputting it to the control unit 30. Furthermore, the document size detection control system 29 has a size discrimination circuit 42 for comparing whether the document size obtained from the address input from the first latch circuit 34 or the second latch circuit 38 is equivalent to the figurate paper size stored in a memory 41 of the control unit 30 beforehand or not and discriminating that the document D is of a predetermined size. The first boundary detection circuit 33 and the second boundary detection circuit 37 detect the document size by detecting changes in the reflection factor generated in the boundary position between the coating face 12a of the platen sheet 12 and the document D by the CCD sensors 24 to 28.

The control unit 30, at the time of pre-scanning before image reading scanning by the CCD sensors 24 to 28, when forward scanning the document D by the optical unit 13, sets the pulse motor 31 and the CCD control substrate 32 so as to detect the document size using the second document size detection unit 40 for detecting the document size on the basis of an output signal from the monochromatic CCD sensor 28. Namely, to detect the document size on the basis of the output signal from the monochromatic CCD sensor 28, the control unit 30 controls the pulse motor 31 so as to scan at a speed of 210 mm/s by the optical unit 13.

However, at the time of document size detection using the monochromatic CCD sensor 28, when the document D is a color document, depending on color tone and color strength, the boundary between the coating face 12a of the platen sheet 12 and the document D cannot be detected and impossibility of document size detection may be caused. When the document size cannot be detected at the time of forward scanning of pre-scanning like this, the control unit 30 sets the pulse motor 31 and the CCD control substrate 32 so as to detect the document size using the first document size detection unit 36 for scanning the document D again at the time of backward operation of the optical unit 13 of pre-scanning and detecting the document size on the basis of output signals from the color CCD sensors 24 to 27. Namely, to detect the document size on the basis of the output signals from the color CCD sensors 24 to 27, the control unit 30 controls the pulse motor 31 so as to scan at a speed of 105 mm/s by the optical unit 13.

Further, when the document size can be detected at the time of forward scanning of pre-scanning, the control unit 30 controls the pulse motor 31 so as to return the optical unit 13 to the wait position at the same speed of 210 mm/s as that of forward scanning without executing backward scanning to obtain output signals from the color CCD sensors 24 to 27.

Figure 5:
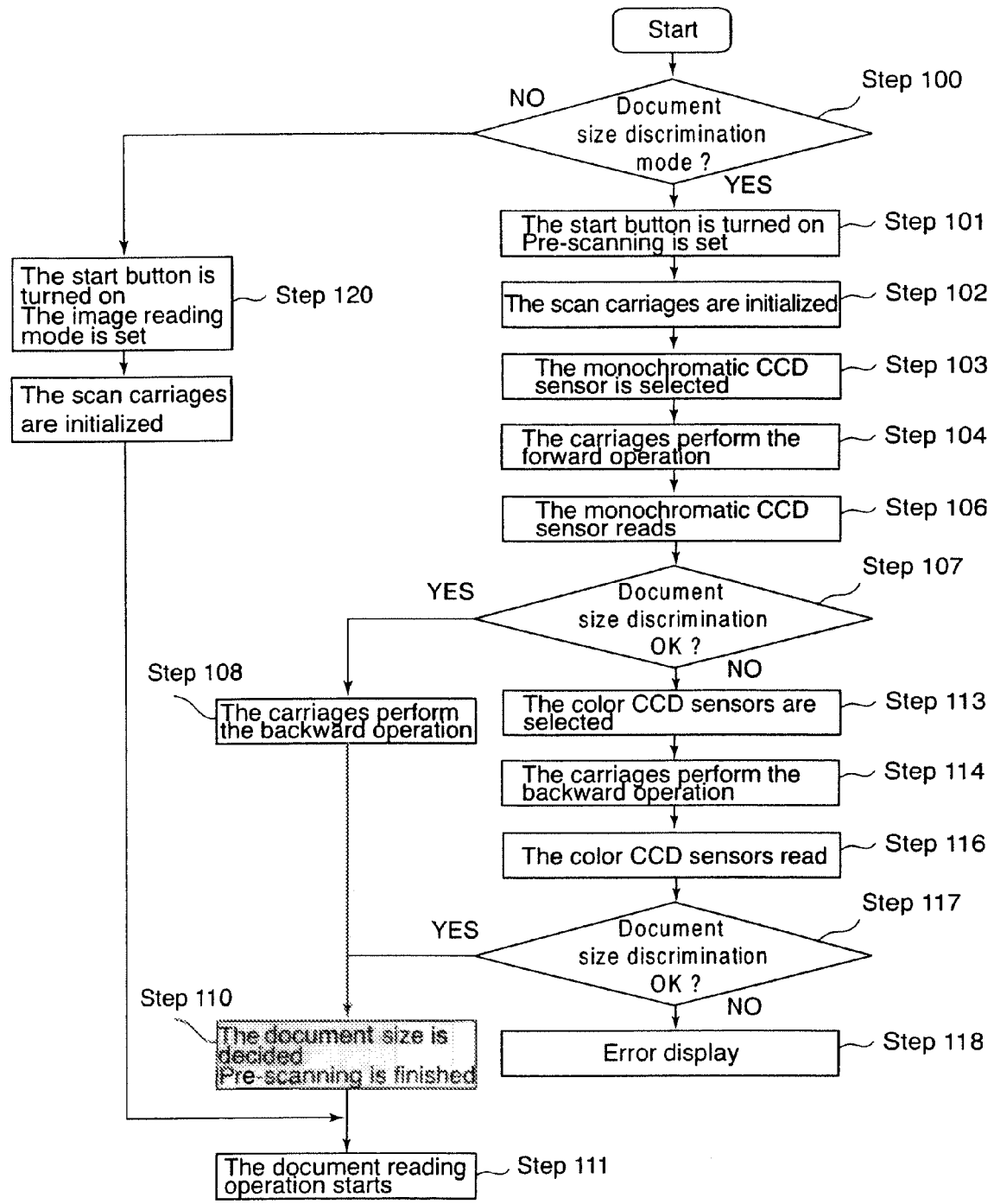
FIG. 5 is a flow chart showing the document size discrimination process of the embodiment of the present invention.

The color scanner 10 structured in this way, at the start time of image reading, pre-scans the document plate 11, discriminates the document size, and then starts the document D reading operation. Next, the document size discrimination process by pre-scanning will be described by referring to the flow chart shown in FIG. 5. When the image reading operation is started, at Step 100, the process compares whether the operation mode is the document size discrimination mode or not. When the document size is not set on the control panel 2 and it must be discriminated, the process goes to Step 101. On the other hand, when an operator sets the document size from the control panel 2 and the document size discrimination scanning is not necessary, the process goes to Step 120.

When the start button 2c is turned on at Step 101, Pre-scan for detecting the document size is set and at Step 102, the first and second carriages 17 and 21 are initialized to the start positions indicated by dotted lines shown in FIG. 1. At Step 103, to select the second document size detection unit 40 using the monochromatic CCD sensor 28 and detect the document size, the pulse motor 31 or the CCD control substrate 32 is set. At Step 104, the xenon lamp 14 is turned on, and the first and second carriages 17 and 21 perform the forward operation from the start positions in the direction of the arrow s at a speed of 210 mm/s and forward scan the document D on the document plate 11 and the platen sheet 12. At Step 106, the monochromatic CCD sensor 28 sequentially reads the reflected light from the document D and the platen sheet 12 and at Step 107, it discriminates the document size.

Figure 6:
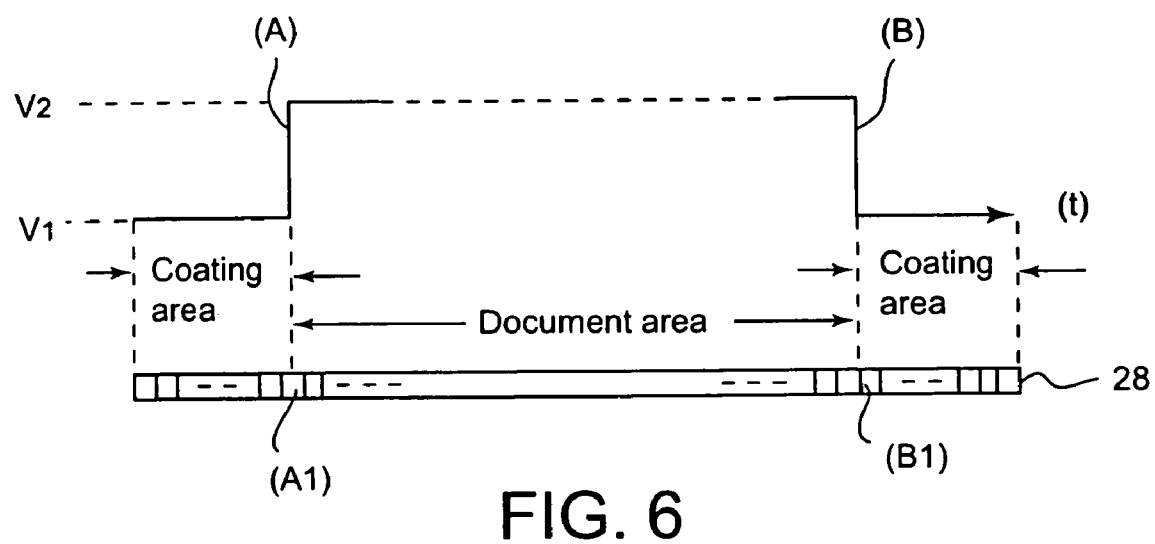
FIG. 6 is a timing chart showing an output signal from a monochromatic CCD sensor of the embodiment of the present invention.

Namely, at Step 106, by forward scanning of the document D and the platen sheet 12, from the monochromatic CCD sensor 28, the output signal shown in the timing chart in FIG. 6 is output. The second boundary detection circuit 37 is in the boundary position between the coating face 12a of the platen sheet 12 and the document D and outputs (A) and (B) shown in FIG. 6 the output voltage of which varies from v1 to v2 or from v2 to v1. The second latch circuit 38 recognizes and latches the output timing from the second boundary detection circuit 37 as addresses of the monochromatic CCD sensor 28 equivalent to the front end (A1) and rear end (B1) of the document D in the main scanning direction and inputs it to the control unit 30.

At the same time, the second latch circuit 38 recognizes and latches the timing that the boundary positions (A) and (B) between the area of the coating face 12a of the platen sheet 12 and the area of the document D are not output during forward moving of the first and second carriages 17 and 21 as an address indicating the end of the document D in the sub-scanning direction and inputs it to the control unit 30. For the timing in the sub-scanning direction, the pulse of the pulse motor 31 is used.

At Step 107, the control unit 30 recognizes the area of the document D by address input from the second latch circuit 38, compares it with the figurate paper size stored in the memory 41 by the size discrimination circuit 42, thereby discriminates the size of the document D. In the size discrimination circuit 42, when the area of the document D coincides with the figurate paper size and the document size can be discriminated, the process goes to Step 108. When the area of the document D cannot be recognized or the recognized area of the document D does not coincide with the figurate paper size in the size discrimination circuit 42 and the document size cannot be discriminated, the process goes to Step 113.

At Step 108, the xenon lamp 14 is turned off, and the first and second carriages 17 and 21 perform the backward operation at the same speed of 210 mm/s as that of the forward operation in the direction of the arrow t and return to the wait position, and at Step 110, the document size is decided, and the pre-scanning is finished, and at Step 111, the image reading operation is started. At Step 113, the document size detection using the monochromatic CCD sensor 28 at the time of forward scanning is switched to the document size detection using the color CCD sensors 24 to 27 and backward scanning is executed.

At Step 113, the first document size detection unit 36 using the color CCD sensors 24 to 27 is selected and the pulse motor 31 or the CCD control substrate 32 is set. At Step 114, the xenon lamp 14 is turned on, and the first and second carriages 17 and 21 perform the backward operation at a speed of 105 mm/s, which is ½ of that of the forward operation, in the direction of the arrow t, and the document D on the document plate 11 and the platen sheet 12 are backward scanned. At Step 116, in the same way as with Step 106, the color CCD sensors 24 to 27 sequentially read the reflected light from the document D and the platen sheet 12 and at Step 117, in the same way as with Step 107, discriminate the document size.

At Step 116, in place of the second document size detection 115 unit 40 at Step 106, the first document size detection unit 36 latches the boundary address between the coating face 12a of the platen sheet 12 and the document D and inputs it to the control unit 30. At Step 117, the control unit 30 recognizes the area of the document D from the input address and discriminates in the size discrimination circuit 42 whether it is equivalent to the figurate paper size stored in the memory 41 or not, and when the area of the document D recognized by output signals from the color CCD sensors 24 to 27 coincides with the figurate paper size and the document size can be discriminated, the process goes to Step 110.

At Step 110, the document size is decided and the pre-scanning is finished. At Step 117, when the area of the document D cannot be recognized even by the color CCD sensors 24 to 27 or the recognized area of the document D does not coincide with the figurate paper size and the document size cannot be discriminated, the process goes to Step 118. At Step 118, a document size detection error is displayed on the display panel b. Further, when the document size discrimination mode is not set at the start time of the image reading operation, by turning the start button 2c on at Step 120, the image reading mode is set and at Step 121, the first and second carriages 17 and 21 are initialized to the start positions indicated by dotted lines shown in FIG. 1 by the pulse motor 31. Next, the image reading operation is started at Step 111 without pre-scanning.

According to this embodiment, the color scanner 10, regardless of the kind of document D, at the time of forward scanning of pre-scanning, discriminates the document size on the basis of an output signal from the monochromatic CCD sensor 28. When a discrimination error of the document size is caused in the monochromatic CCD sensor 28, during the backward operation of pre-scanning, the color scanner 10 scans the document D again using the color CCD sensors 24 to 27 and detects the document size on the basis of output signals from the color CCD sensors 24 to 27. Further, when the document size can be discriminated by forward scanning of pre-scanning, at the time of the backward operation of pre-scanning, the color scanner 10 does not scan the document D and returns the optical unit 13 to its wait position.

Therefore, when the discrimination of the document size is finished only by forward scanning using the high-speed monochromatic CCD sensor 28, the optical unit 13 can be returned to its wait position at high speed, and the pre-scanning time is shortened, thus the reading operation can be speeded up. Moreover, when the document size cannot be detected by the monochromatic CCD sensor 28, during the backward operation, the document size detection is executed again using the color CCD sensors 24 to 27 capable of surely detecting even a color document, thus the document size can be surely discriminated and the apparatus can respond to diversification of documents.

Further, the present invention is not limited to the aforementioned embodiments and it can be changed within a range which is not deviated from the objects of the present invention. For example, the light source of the color image reading apparatus, if the photoelectric conversion device can detect light from a document, may be a halogen lamp and the optical image information may be transmitted light from a document instead of reflected light. Further, the size of pixels of the photoelectric conversion device and the number of pixels are not limited. Furthermore, with respect to the platen sheet which is a background of a document, if a difference in the reflection factor from the document or the transmission factor can be made clear, the material thereof is optional and may be matte-finished.

As mentioned above in detail, according to the present invention, at the time of document size detection of the color image reading apparatus, forward scanning is executed using the high-speed photoelectric conversion device for reading a monochromatic image and the pre-scanning time is shortened, thus the image reading operation can be speeded up. Further, when a document size detection error is caused during the forward operation by the high-speed photoelectric conversion device, the document size detection is executed using the photoelectric conversion device for surely reading a color image, thus the document size can be surely detected regardless of the document kind and the apparatus can respond to diversification of document kinds.

What is claimed is:

1. A color image reading apparatus comprising:
   a light source to irradiate a document relatively moving and scan said document;
   a first photoelectric conversion device to receive optical image information from said document and a background of said document by said light source and obtain first electric signal information at a first speed;
   a second photoelectric conversion device to receive said optical image information and obtain second electric signal information at a second speed higher than said first speed;
   a first document size detection unit to detect, on the basis of said first electric signal information from said first photoelectric conversion device, a boundary between said document and said background of said document and detecting a document size;
   a second document size detection unit to detect, on the basis of said second electric signal information from said second photoelectric conversion device, said boundary between said document and said background of said document and detect said document size; and
   a control unit to control, at the time of forward scanning of said document by said light source, so as to detect said document size by said second document size detection unit.

2. The color image reading apparatus according to claim 1, further comprising a size discrimination unit to discriminate from said document size detected by said second document size detection unit that said document is of a predetermined size.

3. The color image reading apparatus according to claim 2, wherein said control unit, when said document size cannot be discriminated by said size discrimination unit, at the time of backward scanning of said document by said light source, controls so as to execute said document size detection using said first document size detection unit.

4. The color image reading apparatus according to claim 2, wherein said control unit, when said document size is discriminated by said size discrimination unit, controls so as to relatively return said light source and said document at the same speed as that of said forward scanning.

5. The color image reading apparatus according to claim 2, wherein said control unit, when said document size cannot be discriminated by said size discrimination unit, at the time of backward scanning of said document by said light source, controls so as to execute said document size detection using said first document size detection unit and when said document size is discriminated by said size discrimination unit, controls so as to relatively return said light source and said document at the same speed as that of said forward scanning.

6. The color image reading apparatus according to claim 1, wherein said document size detection is executed at the time of pre-scanning of said document by said light source.

7. The color image reading apparatus according to claim 1, wherein said document is scanned by moving said light source.

8. The color image reading apparatus according to claim 1, wherein said first photoelectric conversion device is a plurality of color photoelectric conversion devices for receiving said optical image information and obtaining color electric signal information and said second photoelectric conversion device is a monochromatic photoelectric conversion device for receiving said optical image information and obtaining monochromatic electric signal information.

9. A document size detecting method in a color image reading apparatus having a first photoelectric conversion device to receive optical image information from a document by a light source moving relatively to said document and obtaining electric signal information at a first speed and a second photoelectric conversion device to receive said optical image information and obtaining said electric signal information at a second speed higher than said first speed, and detect, on the basis of said first electric signal information from said first photoelectric conversion device, a boundary between said document and a background of said document, thereby detecting said document size or detecting, on the basis of said second electric signal information from said second photoelectric conversion device, said boundary between said document and said background of said document, thereby detecting said document size, comprising:
   performing said document size detection, at the time of forward scanning of said document by said light source, on the basis of said second electric signal information from said second photoelectric conversion device.

10. The document size detecting method in a color image reading apparatus according to claim 9, further comprising:
    executing said document size detection on the basis of said first electric signal information from said first photoelectric conversion device at the time of backward scanning of said document by said light source when said document cannot be discriminated to be of a predetermined size from said document size detected by said forward scanning.

11. The document size detecting method in a color image reading apparatus according to claim 9, further comprising:
    returning relatively said document and said light source at the same speed as that of said forward scanning when said document can be discriminated to be of a predetermined size from said document size detected by said forward scanning.

12. The document size detecting method in a color image reading apparatus according to claim 9, further comprising:
    executing said document size detection on the basis of said first electric signal information from said first photoelectric conversion device at the time of backward scanning of said document by said light source when said document cannot be discriminated to be of a predetermined size from said document size detected by said forward scanning; and
    returning relatively said document and said light source at the same speed as that of said forward scanning when said document can be discriminated to be of a predetermined size from said document size detected by said forward scanning.

13. The document size detecting method in a color image reading apparatus according to claim 9, further comprising:
executing said document size detection at the time of pre-scanning of said document by said light source.

14. The document size detecting method in a color image reading apparatus according to claim 9, further comprising:
moving relatively said document and said light source by moving said light source.

15. The document size detecting method in a color image reading apparatus according to claim 9, wherein said first photoelectric conversion device is a plurality of color photoelectric conversion devices for receiving said optical image information and obtaining color electric signal information and said second photoelectric conversion device is a monochromatic photoelectric conversion device for receiving said optical image information and obtaining monochromatic electric signal information.

* * * * *